W. L. MILLER.
CHUCK.
APPLICATION FILED MAR. 20, 1915.
1,188,807.
Patented June 27, 1916.
2 SHEETS—SHEET 1.
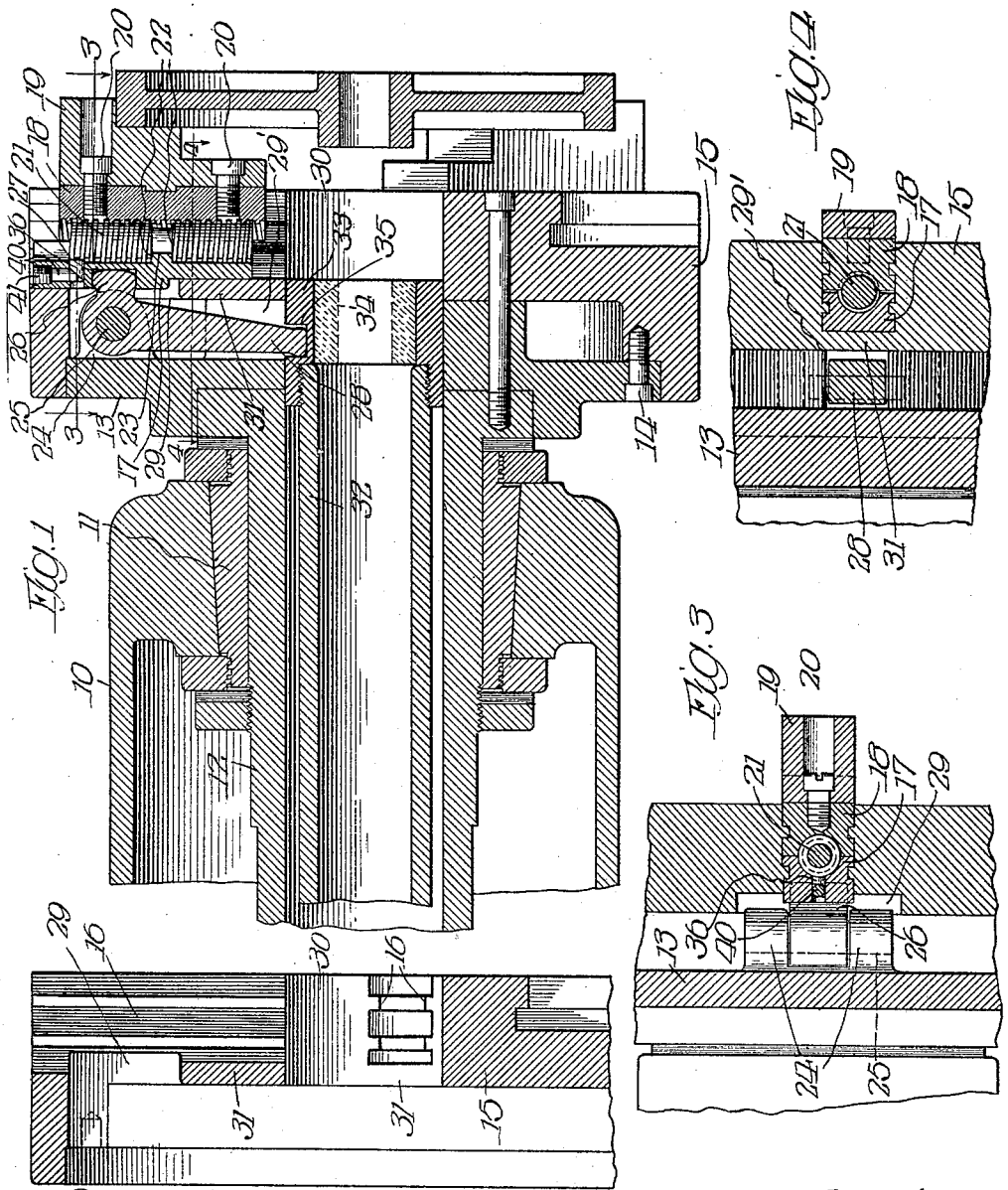
Witnesses
Inventor
William L. Miller,
By Pond & Wilson Attys

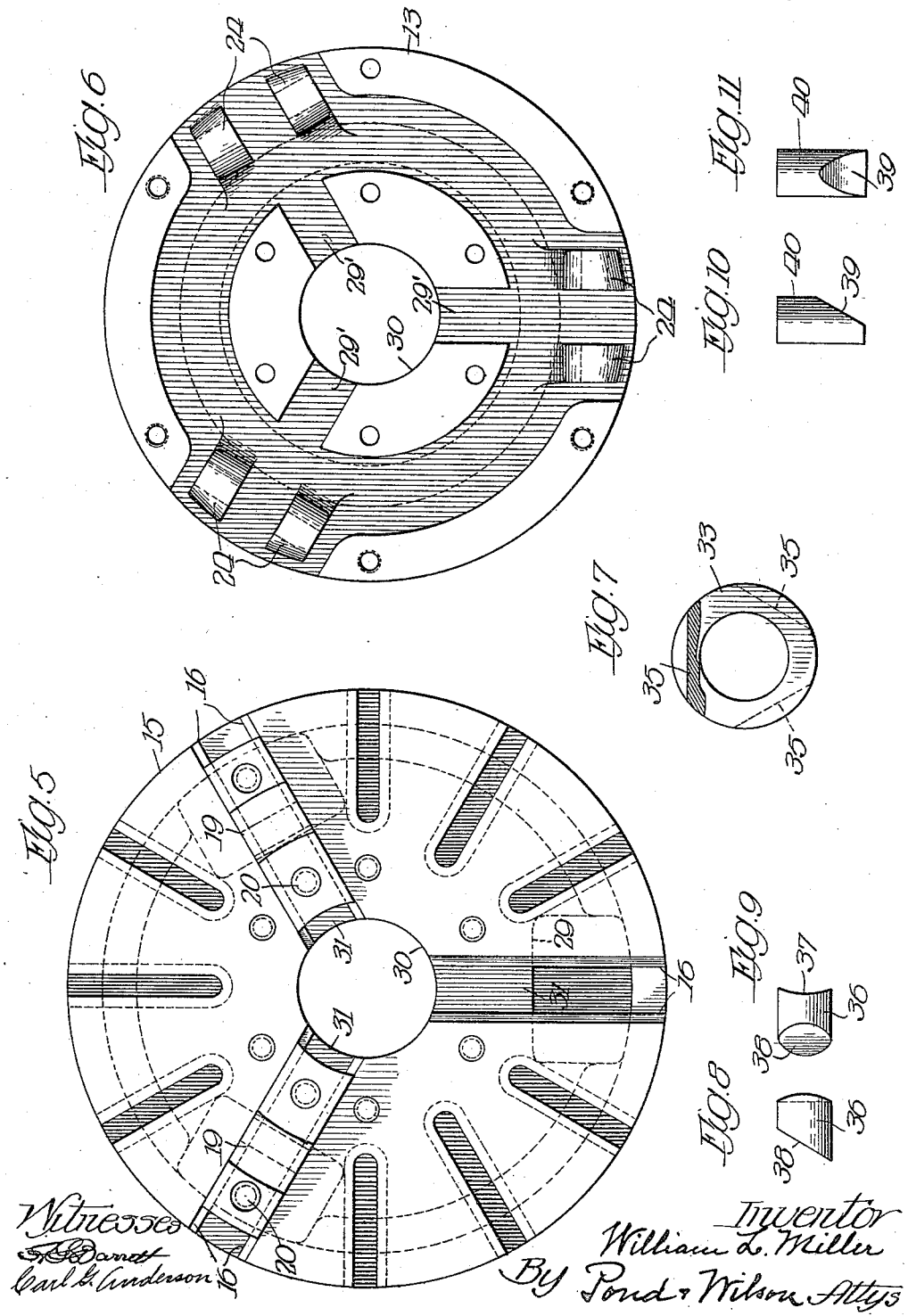

UNITED STATES PATENT OFFICE.

WILLIAM L. MILLER, OF MADISON, WISCONSIN, ASSIGNOR TO GISHOLT MACHINE COMPANY, OF MADISON, WISCONSIN, A CORPORATION OF WISCONSIN.

CHUCK.

1,188,807.  Specification of Letters Patent.  Patented June 27, 1916.

Application filed March 20, 1915. Serial No. 15,897.

*To all whom it may concern:*

Be it known that I, WILLIAM L. MILLER, a citizen of the United States, residing at Madison, in the county of Dane and State of Wisconsin, have invented certain new and useful Improvements in Chucks, of which the following is a specification.

The invention relates to improvements in chucks for lathes and similar machines employing chucks, and, as to its principal features, relates to that type of chucks wherein the chuck-jaws are actuated between gripping and release positions by levers mounted in the chuck-body, which levers are in turn actuated by an endwise-movable rod extending through the spindle.

One of the objects of the invention is to provide a chuck having increased strength to resist the radial strains on the chuck-body caused by the gripping of the work by the chuck-jaws.

Another object of the invention is to provide an improved lever-operating sleeve capable of receiving a tool-supporting bushing therein.

A further object of the invention, applicable to chucks of that type which employ an adjusting screw for the jaws, is to provide means for locking the screw against turning movement under the thrust of the chuck-jaw.

With these objects in view, the invention consists in the novel structural features hereinafter described, and more particularly pointed out in the claims.

My invention, in one practical and improved form in which the same may be embodied, is illustrattd in the accompanying drawings, wherein—

Figure 1 is an axial sectional view through the chuck and the forward end of the spindle and its bearing; Fig. 2 is a detail sectional view of a portion of the chuck-body lengthwise of one of the slideways thereof; Fig. 3 is a horizontal section on line 3—3 of Fig. 1; Fig. 4 is a horizontal section on the line 4—4 of Fig. 1; Fig. 5 is a front elevation of the chuck-body with one of the jaws removed; Fig. 6 is a front elevation of the back-plate; Fig. 7 is a detail view, partly broken out and in section, of my improved lever-operating sleeve or collar; Fig. 8 is a detail side elevation of the screw-locking member; Fig. 9 is a top plan view of the same; Fig. 10 is a detail side elevation of the screw-lock wedge; and Fig. 11 is another side elevation of the screw-lock wedge, as viewed from the right of Fig. 10.

Referring to the drawings, 10 designates a portion of the headstock frame of a lathe, 11 one of the spindle bearings, and 12 a tubular spindle. On the outer end of the spindle 12 is secured the back plate 13 of the chuck, to which is united, by cap screws 14, the chuck-body 15. This latter, as best shown in Figs. 2 and 5, is provided with the radial slideway 16, in which are mounted the jaw-carriers 17 and the jaws, each of the latter, in the instance shown, comprising a jaw-base 18, and a jaw proper 19 secured to the base by countersunk cap-screws 20. In the jaw-carrier 17 is mounted for turning movement the usual adjusting screw 21 having shouldered portions 22 which abut against a coöperating ledge or shoulder 23 on the concave face of the jaw-carrier, permitting rotary, but preventing endwise, movement of the screw. On the inner face of the back plate 13 are lugs 24 carrying pivot pins 25, on which are mounted the jaw-actuating levers, each of the latter comprising a short arm 26 that engages a recess 27 in the back of the jaw-carrier 17, and a long inwardly extending arm 28. The jaw-actuating levers are housed in recesses that lie behind the slideways 16, the outer portions 29 of said recesses being formed in the chuck-body and communicating with the outer portions of the slideways, and the inner portions 29′ being formed as radial grooves in the hub of the back-plate (Fig. 6); and the inner ends of the slideways and the recesses both communicate with the central bore 30 of the chuck. Heretofore, so far as I am aware, the radial slideways of the chuck-body have been made of a depth such that they extended entirely through all but the rim portion of the chuck-body, communicating with the lever-housing recesses throughout the full length of the latter, and thus leaving only the rear portion of the rim of the chuck-body to serve as a girt for the latter. This radial slotting of the chuck-body to provide the slideways extending entirely through the chuck-body from its front to its countersunk rear face, had the effect of greatly weakening the chuck-body, rendering it liable to expand and contract under the gripping strains of the jaws on the work, accordingly as the latter was gripped exteriorly or interiorly.

One of the objects of my present invention is to strengthen and reinforce the chuck-body to resist these strains, and this I accomplish by providing, between the inner portions of the slideway and the recess, a wall 31, which is preferably an integral part of the chuck-body casting and connects the inner rear portions of the side walls of the slideway. It will thus be seen that these walls 31, together with the intermediate integral portions of the chuck-body between said walls, constitute in effect an inner girt that embraces the bore of the chuck-body inwardly of the outer circumference of the latter and substantially midway of the thickness of the chuck-body, such girt obviously affording a high degree of resistance to expansive and contractile strains imparted through the chuck jaws.

Referring next to another feature of improvement which the invention includes, 32 designates the chuck-actuating tube or bar that commonly extends axially through the spindle 12, and 33 designates a sleeve or collar mounted on the forward end of the tube 32 that engages the inner ends of the lever arms 28. Heretofore, so far as I am aware, this sleeve 33 has been formed with a continuous circumferential groove that engages the arms of the levers 28. In machines of this character, when employing a long tool, such as a boring bar, in the tool holder, it is advantageous to provide a supporting bushing for the free end of the tool in the bore of the chuck itself. It is impracticable to center such a bushing in the bore of the body member of ordinary chucks of this type, since, owing to the expansion and contraction of the chuck-body under the gripping effect of the jaws, such supporting bushing either becomes so loose in the chuck-bore as to be useless, or it is compressed so hard that its internal diameter is contracted and rendered too small. In accordance with my present improvement, I have modified the construction of the lever-operating sleeve or collar 33, whereby I am enabled to make the bore thereof of sufficient diameter to accommodate such extra bushing (indicated at dotted lines by 34 in Fig. 1). This I accomplish, without sacrifice of the necessary strength in this member, by dispensing with the annular groove heretofore employed in the circumference thereof and substituting therefor a series of separated tangential grooves 35 (Fig. 7) that correspond in number with and engage the inner ends of the lever arms 28. This construction, it will readily be seen, permits a sufficient enlargement of the bore of the sleeve to accommodate the extra supporting bushing 34 without much sacrifice of strength in the sleeve itself.

In chucks of the type employing adjusting screws for the chuck-jaws, trouble has sometimes been experienced from the tendency of the adjusting screws to gradually yield and turn under the lengthwise strain of the jaws thereon, thereby varying the fixed adjustment of the jaws. I have devised a means for preventing this, the same consisting of a simple device in the nature of a brake for locking the adjusting screw securely against such accidental or unintentional turning movement. In a suitable recess in the jaw-carrier 17, I mount a locking shoe 36 (see the detail views Figs. 8 and 9), said shoe having a concave face 37 at its inner end that bears laterally against the adjusting screw 21, and an inclined or cam-shaped outer end 38, which latter is engaged by the inclined or cam-shaped lower end 39 of a wedge member 40 that lies in a socket of the jaw-carrier that is disposed at right angles to the socket accommodating the locking member 36. The upper end of this socket is internally threaded to receive a short screw 41 by which the wedge 40 may be forced down upon the cam-shaped outer end 38 of the locking member 36, thereby jamming the latter hard against the screw with sufficient friction to prevent any turning movement of the latter. This screw lock has the further function of crowding the coöperating screw-threads of the screw and the jaw-base into intimate engagement with each other.

From the foregoing description, the nature and advantages of the described improvements will be readily understood by those skilled in the art.

It will be apparent that the mechanism shown and described may be modified in specific details within the scope of the appended claims without altering its essential character, or sacrificing the advantages which it secures. Hence, without limiting myself to the precise embodiment of the invention herein disclosed,

I claim:

1. A chuck having a body portion provided with a radial slideway for a jaw carrier, a back plate, and a recess in rear of said slideway to receive a jaw-actuating member, said back-plate forming the rear wall of said recess; the outer portions of said slideway and recess communicating with each other and their inner portions being separated by a wall forming an integral part of the body portion of the chuck.

2. A chuck having a body portion and a back plate provided with a central bore, said body portion being formed with a radial slideway for a jaw-carrier opening into said bore and said back plate being radially grooved to form a recess in rear of said slideway to receive a jaw-actuating member and also communicating with said bore; the outer portions of said slideway and recess communicating with each other and their inner portions being separated by a wall forming an integral part of the body portion of the chuck.

3. A chuck having a body portion, a back plate, a central bore, a plurality of radial slideways in said body portion for jaw-carriers opening into said bore, and a corresponding plurality of recesses in rear of said slideways, respectively between said body portion and back plate, to receive jaw-actuating members, said recesses also opening into said bore and the outer portions of said slideways and recesses communicating with each other, and walls between the inner portions of said respective slideways and recesses, said walls integrally connecting the inner rear portions of the side walls of said slideways and, with the portions of the chuck-body intermediate said slideways, forming a girt embracing the bore of the chuck-body inwardly of the outer circumference and intermediate the front and rear faces of the latter.

4. In a chuck of the lever-operated type, a lever-operating sleeve adapted to be mounted in the bore of the chuck on the forward end of an actuating member extending through the spindle, said lever-operating sleeve having a bore of sufficient diameter to hold a tool-supporting bushing therein, and provided in its circumference with a plurality of spaced recesses or sockets to engage the inner ends of the jaw-actuating levers.

5. In a chuck of the lever-operated type, a lever-operating sleeve adapted to be mounted in the bore of the chuck on the forward end of an actuating member extending through the spindle, said lever-operating sleeve having a bore of sufficient diameter to hold a tool-supporting bushing therein, and provided about its circumference with a plurality of spaced tangential grooves to engage the inner ends of the jaw-actuating levers.

6. In a chuck of the lever-operated type, a lever-operating member adapted to be mounted in the bore of the chuck on the forward end of an actuating member extending through the spindle, said lever-operating member being provided in its circumference with a plurality of recesses or sockets to engage the inner ends of the jaw-actuating levers, said recesses or sockets being spaced from each other by circumferential portions of said lever-operating member.

WILLIAM L. MILLER.

Witnesses:
A. B. Morey,
E. R. Seward.

Copies of this patent may be obtained for five cents each, by addressing the "Commissioner of Patents, Washington, D. C."